June 2, 1942.  R. STUART  2,284,776
MICROPHOTO INDEXING SYSTEM
Filed Sept. 30, 1940

INVENTOR.
Robert Stuart,
BY
ATTORNEY.

Patented June 2, 1942

2,284,776

UNITED STATES PATENT OFFICE 2,284,776

MICROPHOTO INDEXING SYSTEM

Robert Stuart, Forest Hills, Long Island, N. Y.

Application September 30, 1940, Serial No. 359,058

2 Claims. (Cl. 88—24)

This invention relates to a microfilm index and may be used to index a plurality of subjects on the same sheet applied by microphotography, and which, under ordinary conditions are not readable. An object of the invention is to apply microphotographic subjects to a sheet in squares or in a plurality of rows and columns which sheet is provided with a readable index, readable in two directions at right angles to each other. The film sheet may be located on a carrier which is indexed corresponding to said sheet and adjustable therewith, whereby any square may be located and the subject of the square is obtained by a reference character. Another object of the invention is to provide a square or portion of the sheet with a microphotograph of the squares of the sheet and the index marks locating the squares, and each square is provided with a reference to the subject, so that the subject of all the squares and the index of each subject may be read at the same time by projecting this reference square, and then the carrier may be adjusted to the particular square indicated, and another object of the invention is to provide an indexing system for microphotographic subjects located on a sheet, having a readable title and index characters to locate the squares of the sheet, and having certain squares with the contents of the sheet thereon and indexing references to the particular square where the subject is to be found.

These and other objects of the invention will be understood from the following specification and the accompanying drawing, in which.

Figures 1, 2, 3, 4:
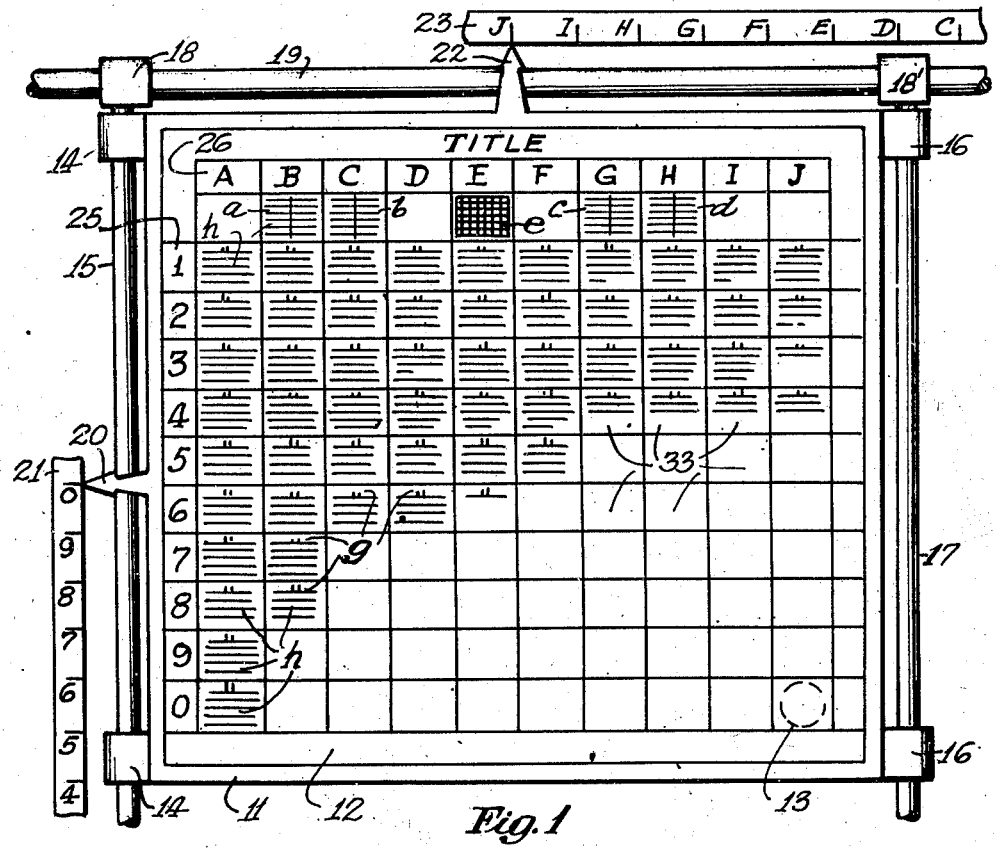
Fig. 1 is a plan view of a sheet with microphotographic subjects arranged in squares and having an index to locate each square.
Fig. 2 is an end view of the construction shown in Fig. 1.
Fig. 3 is a layout of the contents of the sheet in Fig. 1.
Fig. 4 is a layout of the reference square in Fig. 1.

Microfilm is coming into general use for commercial purposes and in one form the photographic subjects are applied in squares on a sheet so that two references are required to locate each square. Microfilm cannot be read until it is enlarged by a projector, or otherwise, and for this reason the subject of the squares cannot be identified except through the index. The sheets are usually provided with a title so that they can be readily selected from a file and they are provided with an index along one edge and a second index at right angles along another edge which are also readable, or may be applied to a frame or holder means which has these index references and a suitable method of reading the same. In order to quickly locate a square of the sheet having a particular subject and without having to refer to a separate list or index, a predetermined square or portion of the sheet has applied thereto a miniature photograph of the sheet itself with the cross indexing arrangement, but instead of the subject of each square, this miniature contains a reference, such as a page number, and when this square is enlarged the index for all the squares appear at the same time and any square may be found containing the desired page or subject matter. In addition to this, the contents of the sheet may be listed on one or more squares and each subject listed in the contents may contain a page number, which can be found from the reference square or it may contain a direct reference of the index to locate the particular squares dealing with the subject listed in the contents.

The invention is shown applied to microfilm but it is to be understood that it may be applied to photographic reductions of any type which have to be enlarged in order to be read.

In the drawing, 11 is a rectangular frame upon which the sheet 12 of microfilm is mounted and which may be associated with a projector 13 which can be brought into register with any square of the sheet 12 to project and enlarge the subject thereof. The frame 11 is provided with lugs 14 at each end which slide on the rod 15 and with the corresponding lugs 16 which slide on the rod 17, thereby providing for the movement of the frame in one direction. The rod 15 is mounted in a lug 18 at one side and the rod 17 is mounted in the lug 18' at the opposite side which lugs slide on the rod 19, and a corresponding structure is provided for the other side of the frame but not shown in the drawing and which enables the frame 12 to be moved at right angles to the first movement. A construction of this kind is shown in co-pending application Serial No. 254,694, filed February 4, 1939, and which has become Patent No. 2,256,178, dated September 16, 1941.

The sheet 12 is provided with a readable title at the top and it is provided with a horizontal row of index characters 26 indicated by the capital letters A to J inclusive; it is also provided with a vertical index 25 containing the figures from 1 to 0 inclusive. A tab 22 attached to the frame registers with the letters on the index bar 23 so arranged that this tab indicates the vertical row of squares that have been selected. Another tab 20 registers with the fixed bar 21 and indicates on this bar the vertical row in which the selected square is located. The square that appears at the intersection of the vertical and horizontal rows selected is in register with the projector 13 and this square can be projected and enlarged for reading purposes as desired.

The top row of squares is reserved for the contents of the sheet as indicated at a, b, c and d and the reference square as indicated at e. The contents may be arranged as illustrated in Fig. 3 in which the printed matter appears at 27 and the corresponding page appears in the column 28. In addition to this, and where the arrangement permits, the indexing characters for the page may also be shown as indicated at 36 in which, for instance, F1 corresponds with page 26, H1 corresponds with page 28 and A2 corresponds with page 31.

The reference square e corresponds with Fig. 4 which includes all the squares of sheet 12 with the horizontal index 31 and the vertical index 30 arranged in the same order as in sheet 12. The squares in Fig. 4 each contain a reference to the subject found in the corresponding squares 33 in sheet 12, the squares in Fig. 4 being indicated by 32.

The application of the system will be understood by considering sheet 12 applied to the pages of a book in which each square contains one page with the printed matter h and the page number g which is not readable. If the page is known and it is desired to locate the particular square having this page, the reference square e is enlarged and the page number is found from the consecutive order of the paging as in Fig. 4. At the top of the square where this page is located, the letter index is found and at the left hand side the number index is found. The index pointers 22 and 20 are adjusted accordingly and the subject desired may be projected through 13.

If the page is not known the subject is found by enlarging the contents square and from this square the page number may be taken to locate the page as described above, however, if the contents contain the index reference the square may be located from the letter and numeral appearing in the index opposite the particular subject.

This invention enables a microfilm subject to be found in a group of subjects by enlarging the index of the subjects so that it can be read in the same manner as the micro film subjects themselves are read.

Having thus described my invention, I claim:

1. A microphotographic slide film having a plurality of rows and columns of separate picture elements and supported in a holder means provided with index arms disposed at right angles to each other for locating any particular picture element and for positioning the same in projecting position in a projecting means, whereby an enlarged image of said picture element may be projected upon a conventional screen for viewing, in combination with a reference microphotographic element in a predetermined location on said slide film, said reference element having index references corresponding with the index of the holder means and the contents associated with each index.

2. A microphotographic slide film having a plurality of rows and columns of separate picture elements and supported in a holder means provided with index arms disposed at right angles to each other for locating any particular picture element and for positioning the same in projecting position in a projecting means, whereby an enlarged image of said picture element may be projected upon a conventional screen for viewing, in combination with a reference microphotographic element in a predetermined location on said slide film, said reference element having index marks for all the picture elements of the film, and the contents thereof, and index references corresponding with the index of the holder and when projected making the contents of all the elements of the film with their index references readable at the same time.

ROBERT STUART.